Figure 1:
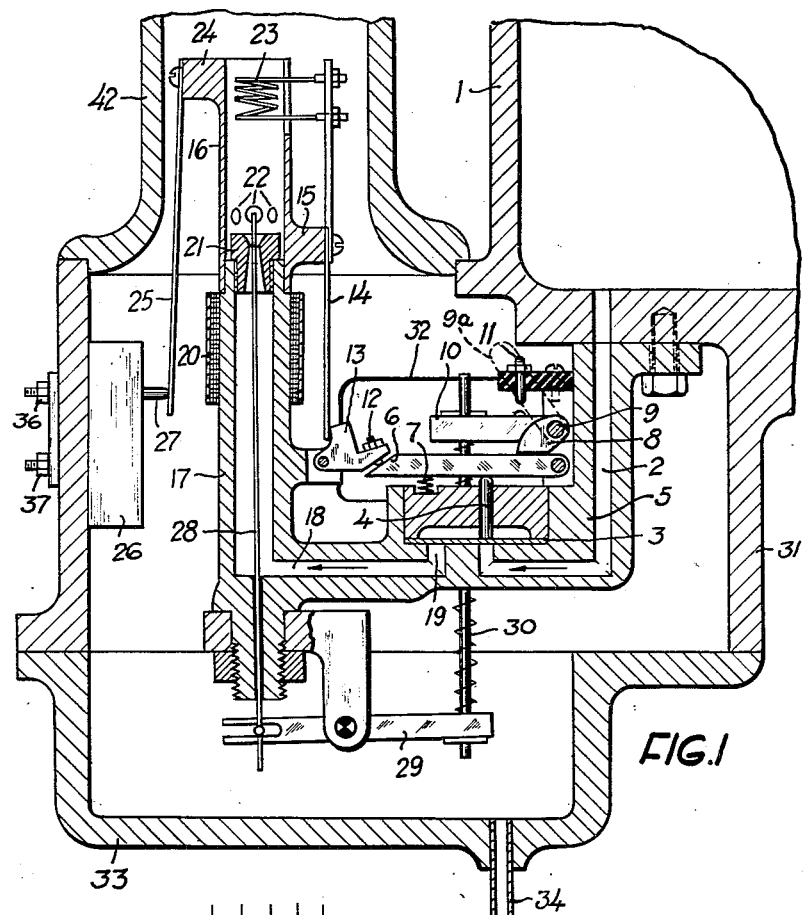

March 19, 1957 K. G. GRAUERS 2,785,741
AUTOMATIC CONTROLLING MEANS FOR LIQUID FUEL BURNERS
Filed Aug. 11, 1954

United States Patent Office

2,785,741
Patented Mar. 19, 1957

2,785,741

AUTOMATIC CONTROLLING MEANS FOR LIQUID FUEL BURNERS

Kjell Georg Grauers, Stockholm, Sweden

Application August 11, 1954, Serial No. 449,207

Claims priority, application Sweden November 12, 1953

8 Claims. (Cl. 158—28)

The present invention refers to automatic controlling means for liquid fuel burners—particularly for heating systems for motor vehicles—said controlling means including a contrivance for the supply of fuel under pressure to a cut-off valve, a vapourizing burner connected to the outlet of said valve, an electric heating resistance for the heating of the burner to vapourizing temperature, and an electric ignition device for the fuel vapours.

The invention has for its object to provide a controlling means which by manual shifting of an operating member is adapted with simple means to ensure a fully automatic initiation of the functioning of the burner, namely, proper heating of the vapourizing part of the burner, opening of the fuel valve, after the temperature required for the vapourization of the fuel has been reached, ignition of the escaping fuel vapours, automatic breaking of the heating and ignition current, when the burner has reached the operating temperature required for continued operation at vapourization through the combustion heat, automatic switching-in of the ignition current and the heating current anew, when the flame is extinguished for some reason or other, automatic closure of the valve, when the burner goes out and cools down, for instance after extinction of the burner on account of a fault occurring in the current supply and when the pressure of the fuel in the inlet of the valve ceases, said controlling means being adapted automatically to cut out the heating and ignition devices and to cut off the fuel supply to the burner when the operating member is returned into its initial position.

The principal feature of the invention resides in that the automatic controlling means in consideration is distinguished by the combination of a thermostat contrivance in heat-conducting relation to said burner and cooperatively connected, first, to a locking member for retaining said valve in its closed position, when the temperature of the burner is lower than the vapourization temperature, and, second, to a switch for interrupting a feeding circuit for said heating resistance and said ignition device at a burner temperature as required for a continued operation of the burner through self-vapourization, a manually adjustable operating member carrying a contact member included in a feeding circuit for said heating resistance and said ignition device and also carrying a cam member, the contact and cam members being correlated so that the cam member will in one position retain said valve in a position of closure while the contact member keeps said feeding circuit open, and will in another position release the valve while the contact member keeps the feeding circuit closed.

Figure 2:
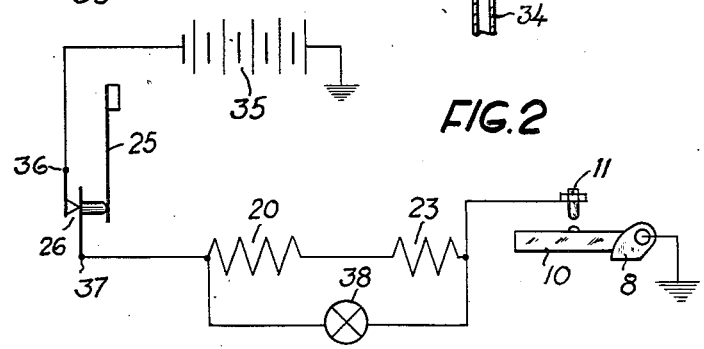

Further features and details of the invention will be described in the following with reference to the accompanying drawing, wherein Fig. 1 shows a section through one form of embodiment and Fig. 2 illustrates a wiring diagram for the electric connections of the arrangement.

The embodiment of the invention illustrated in the drawing and described hereinafter is specially adapted to be applied in a heating system of the type wherein a fuel supply of a pressure below atmospheric as generated by the motor in operation is sucked into a supply container, in a manner such that the fuel in the container is under a certain pressure above atmospheric as required for the operation of a vapourizing burner after the motor has been brought to a standstill. A passage 2 leads from said container 1 to a cut-off valve having a valve seat, against which a valve member in the form of an elastic diaphragm 3 held fast along the edges thereof is kept pressed by a pressing member 4 in the form of a displaceably guided pin projecting outside a housing 5 containing said passage and the valve, said pin cooperating at the outer end thereof with a valve arm 6, which is swingably mounted at one end thereof while being actuated by a spring 7 in such manner as to tend to become raised from the pin 4 and to swing into a position for the release of the valve member 3. When the burner contrivance is cut off, the arm 6 is kept depressed on the pin by a cam member 8, which is secured to an operating shaft 9 adapted to be shifted manually into various angular positions, said shaft being provided outside the contrivance in consideration with an operating dial or distant operating device 9a while also carrying a contact member in the form of a crank arm 10 cooperating with a companion contact 11 by the operating shaft being shifted manually into the operating position. The displaceable pin 4 thus bears with one end thereof against the diaphragm 3 right opposite the mouth of the inlet passage opening in the surface of the seat, said pin being also adapted to be actuated at the other end thereof for the pressing of the diaphragm 3 against the mouth of the inlet passage 2.

The free end of the valve arm 6 is adapted to be actuated over a set screw 12 by a locking member in the form of a lever 13 actuated by a bimetal strip 14, which is secured at 15 to the burner tube 16, 17. Said tube is constituted by a lower portion 17 connected at the bottom thereof by means of a channel 18 to the outlet 19 from the valve 3, 4 and enclosed near the top thereof by an electric heating resistance 20 while being provided at the top with a burner nozzle 21 of known type. The portion 17 forms the vapourizing tube of the burner. The burner tube 16 proper is arranged on the upper end of said vapourizing tube and is provided at the base thereof, near the nozzle 21, with air intake apertures 22 while also comprising an electric ignition device 23, which in the illustrated example consists of an incandescent resistance but can also be constituted by the electrodes of a spark ignition device.

A bimetal strip 25 is secured at 24 to the upper end of the burner tube 16, the free end of said strip cooperating with a so-called microswitch 26, that is to say, with a switch adapted at very minute displacements of an operating member 27 to close and to open a contact in a definite position or positions of said operating member.

The contrivance may preferably be provided with a cleaning needle 28 extending from the burner nozzle 21 through the vapourizing tube 17 and through a tight guiding means in the lower end of said tube to a point outside the burner, where it is connected through a transmission system comprising a lever 29 and a link 30 to the free end of the elongated contact member 10, while projecting in the position of closure of the operating shaft 9 through the burner nozzle 21.

The electric connections of the various members are shown in the wiring diagram illustrated in Fig. 2. The plus terminal of the battery is connected to the one connection 36 of the microswitch 26, the other connection 37 of which is connected to one end of the heating resistance 20. The other end of the heating resistance is connected to one end of the incandescent resistance 23, the other end of which is connected to the companion contact 11. A signal lamp 38 is shunted between the switch 26 and the contact member 10 to the series-connected resistances 20 and 23. The signal lamp 38 receives current from the battery by the closure of the contacts 26 and 10, 11, and thus indicates that the burner is in its starting condition, that is to say, that the resistance 20 and the ignition device 23 are supplied with current.

The unit is preferably arranged within a casing 31 integral with the wall of the container, said casing being provided on one side thereof with an opening 32 for the admission of the combustion air to the burner and for the purpose of making the most important operating members of the contrivance accessible. Connected to the upper portion of the casing 31 is a passage 42 for the conveyance of the hot combustion gases from the burner to suitable heat exchangers for any heating purpose in view. On having given off a portion of their heat to the cooling water of the motor the combustion gases may preferably be conveyed to a heating plate or heat radiator underneath or around the storage battery in order to prevent an appreciable reduction of the capacity of the storage battery as otherwise caused by an intense cooling of the same.

The casing 31 is preferably provided at the bottom thereof with a removable bottom part 33, from which a narrow outlet pipe 34 for any fuel leaking off leads to a point outside the vehicle.

The mode of operation of the unit is as follows:

In the inoperative position of the operating shaft 9, the contact member 10 and the cam member 8, as shown in the drawing, the valve arm 6 is kept by the cam member 8 in its lower position to lock the valve 3, 4, while the contact between the contact arm 10 and the companion contact 11 is open at the same time. The heating resistance 20 and the incandescent resistance 23 cannot then receive any current. The cold bimetal strip 14 keeps the locking member 13 with the set screw 12 pressed against the valve arm 6 and secures the latter in its position of closure. The other bimetal strip 25, which is also cold, keeps the switch 26 closed.

For the starting of the burner the operating shaft 9 is shifted into operative position by being turned in a clockwise direction in the figure, the contact arm 10 being thus swung upwardly to close the contact 10, 11. At the same time, the link 30 is pulled upwardly, whereby the cleaning needle 28 is caused to move downwardly to release the opening of the burner nozzle 21. When the switch 26 is closed, the resistances 20 and 23 are supplied with current. The signal lamp 38 gives light at the same time. Simultaneously with the shifting of the operating shaft 9 into operative position, the cam member 8 will have been turned to release the valve arm 6, which is retained, however, in the position of closure by the bimetal strip 14. When the burner, particularly the vapourization tube thereof, has reached the temperature required for the vapourization of the fuel, the bimetal strip 14 is bent with the lower end thereof to the left in the drawing, the valve arm 6 and the locking member 13 being thus swung upwardly by the spring 7. The pin 4 is thus released to be displaced upwardly, and the pressure of the fuel in the passage 2 raises the diaphragm 3 sufficiently to let the fuel through to the passage 18 and the vapourization tube 17, where it is vapourized and escapes through the nozzle 21. Within the burner tube, the fuel vapour jet entrains combustion air through the apertures 22, and the fuel-air mixture is ignited by the incandescent resistance 23. A short while thereafter, when the burner has reached the requisite operating temperature, the bimetal strip 25 will bend in a rightward direction in the drawing to cause opening of the switch 26. The current is thus interrupted through the resistances 20 and 23 and through the signal lamp 38. The burner then continues to burn, and the vapourization will then take place by combustion heat being conveyed downwardly from the burner tube 16 to the vapourization tube 17.

If the flame of the burner tube 16 goes out, or if the burner is cooled for some reason or another, so that the vapourization and the combustion can no longer take place in a satisfactory manner, the bimetal strip 25 will again, within a very short space of time, close the contact 26 in order thus to make the heating resistance 20 and the ignition resistance 23 current-carrying.

If the pressure in the container 1 and the passage 2 ceases, for instance if the motor is started and another quantity of fuel is sucked into the container 1, the valve will be closed through the elasticity of the diaphragm 3, the burner then going out for a lack of fuel supply. With any pressure below atmospheric in the passage 2, the diaphragm acts as a non-return valve in order thus to ensure the pumping of fuel into the container through a special inlet to the same, without any special non-return valve being provided in the outlet of the container. If the fuel supply to the burner ceases, the feeding circuit of the resistances 20 and 23 will be closed anew, but this is signalled by the signal lamp 38 to the driver, who may then cut off the heating contrivance by turning the operating shaft 9 back into the position shown in Fig. 1. Every possibility of a flow of fuel to the burner, without the latter being ignited, is thus prevented, and in addition thereto functioning of the burner is avoided when the motor is in operation. If the unit is not cut off, and does not function in the normal manner, such conditions are signalled by the signal lamp.

The invention is not restricted to the embodiment shown. Thus, a thermostat device in the form of one and the same bimetal strip, or some other thermostat, may be adapted at the heating of the burner to release the valve 3, 4 for the admission of fuel only after the burner has been heated to the desired vapourizing temperature, and at a further increase of the temperature through combustion to open the switch 26 or some other suitable contact device. In place of the illustrated diaphragm 3, 4, some other suitable valve contrivance may be made use of, and if the latter does not function itself as a non-return valve, a special non-return valve such as a ball valve, may be provided in the outlet 2 of the container 1. If it is desired by means of warning signals to indicate that the burner functions, when it is not supposed to do so, that is to say, when the motor is in operation, suitable signal lamps or other signalling members may be incorporated for instance between the companion contact 11 and a member which is connected to the battery when the motor is in operation.

What I claim is:

1. An automatic control for a liquid fuel burner comprising a fuel cut-off valve, means to bias the valve to open position, a source of electrical power, an electric heater for heating said burner to a temperature at which the fuel vaporizes, an electric igniting means for igniting the vaporized fuel, an electric circuit including said electric heater and igniting means and being connected to said source of electrical power, a normally closed switch in said electric circuit, heat responsive means responsive to combustion of the fuel in said burner for opening said switch, contacts in said electric circuit, manual control means for opening and closing said contacts, means operatively associated with said manual control means to hold the valve closed when the contacts are opened and to allow the valve to open when the contacts are closed, a second heat responsive means, and means operatively associated with said valve and said second heat responsive means to hold the valve closed when the second heat responsive means is cold and to allow the valve to open when the second heat responsive means is hot.

2. An automatic control for a liquid fuel burner comprising a fuel cut-off valve, means to bias the valve to open position, a source of electrical power, an electric heater for heating said burner to a temperature at which the fuel vaporizes, an electric igniting means for igniting the vaporized fuel, an electric circuit including said electric heater and igniting means and being connected to said source of electrical power, a normally closed switch in said electric circuit, first heat responsive means responsive to combustion of the fuel in said burner for opening said switch, contacts in said electric circuit, a cam, a manual control for said cam and said contacts, an actuating member responsive to said cam for controlling said cut-off valve, said manual control permitting the opening of said cut-off valve in conjunction with closing of said contacts, a locking member contacting said actuating member, and a second heat responsive means responsive to the temperature of said burner for actuating said locking member to cause said actuating member to close said cut-off valve.

3. An automatic control for a liquid fuel burner comprising a fuel cut-off valve, means to bias the valve to open position, a source of electrical power, an electric heater for heating said burner to a temperature at which the fuel vaporizes, an electric igniting means for igniting the vaporized fuel, an electric circuit including said electric heater and igniting means and being connected to said source of electrical power, a normally closed switch in said electric circuit, first heat responsive means responsive to combustion of the fuel in said burner for opening said switch, contact means, manually operated means for operating said contact means for closing and opening said circuit and a thermostatic bimetal member responsive to the temperature of the burner, said manually operated means and said thermostatic bimetal member both being operatively connected with the cut-off valve to maintain said cut-off valve in closed position by said manually operated means when in a position for opening said contact means and by said thermostatic bimetal member when the burner is below fuel vaporizing temperature, said cut-off valve being allowed to open by said manually operated means with said contacts closed and by said thermostatic bimetal member with the burner above fuel vaporizing temperature.

4. In an automatic controlling device for liquid fuel burners as claimed in claim 3, a signal lamp connected in said electric circuit between said switch and said contact means and in parallel with said electric heater and said igniting means.

5. An automatic controlling device for liquid fuel burners comprising a fuel cut-off valve and means for the supply of fuel under pressure thereto, a vaporization burner connected to the outlet of said valve, an electric heating resistance for heating said burner to fuel-vaporization temperature, an electric ignition means for igniting the fuel vapors in the burner, said heating resistance and said ignition means being included in an electric circuit connected to a supply of electric current, a first bimetal strip in heat-conducting relation to an upper portion of the burner heated by the combustion of fuel vapors therein, a circuit opener in said electric circuit operatively connected to said first bimetal strip so as to open said circuit when said upper portion of the burner is heated by combustion of fuel therein, a second bimetal strip in heat-conducting relation to a lower fuel vaporizing portion of the burner, said lower portion being in heat conducting relation with said upper portion and with said heating resistance, a locking member operatively connected to said second bimetal strip and to said cut-off valve so as to maintain said valve in closed position when said lower portion of the burner is below fuel vaporizing temperature, manually operated means, contact means in said electric circuit, and means operatively connecting said cut-off valve with said manually operated means for operating said contact means for closing and opening said electric circuit so that the cut-off valve is maintained in closed position when the manually operated means are in a position for opening said contact means.

6. An automatic controlling device for liquid fuel burners comprising a fuel cut-off valve and means for the supply of fuel under pressure thereto, a vaporization burner connected to the outlet of said valve, an electric heating resistance for heating said burner to fuel vaporization temperature, an electric ignition means for igniting the fuel vapors in the burner, said heating resistance and said ignition means being included in an electric circuit connected to a supply of electric current, thermostatic means responsive to the heat produced by fuel combustion in the burner, a circuit opener for said electric circuit operated when said thermostatic means is heated by fuel combustion in the burner, a thermostatic bimetal member responsive to the temperature of the burner, an operating arm, a locking member contacting therewith, said thermostatic bimetal member being operatively connected by said locking member with said operating arm to maintain the valve in closed position when the burner is below fuel vaporizing temperature, a cam, contacts in said electric circuit, manually operable means fixedly connected to said cam for cooperating with said operating arm and said contacts, said normally operable means, cam and contacts being movable to two operative positions, in one of which the cam operates said operating arm to maintain the cut-off valve in closed position and the contact in the open position, and in the other of which the cam releases said operating arm and the contacts are closed, and a spring acting on said operating arm to move it to a position for opening the cut-off valve when the operating arm is released by both said locking member and said cam.

7. In an automatic controlling device for a liquid fuel burner, a supply of electric current, a source of fuel under pressure, a fuel cut-off valve having an inlet in communication with the source of fuel and an outlet in communication with said burner, means to bias the valve to open position, a valve seat having a surface covered by an elastic membrane having one face against said surface, said inlet and outlet opening through said surface, a pressure member resting against the other side of said membrane opposite said inlet, an electric heating resistance for heating the burner to vaporization temperature, electric ignition means for igniting the fuel vapors in the burner, said heating resistance and said ignition means being included in an electric feeding circuit connected to said supply of electric current, thermostatic means responsive to the heat produced by fuel vapor combustion in the burner, a contact in said feeding circuit, manually operable means for operating said contact, a thermostatic bimetal member responsive to the temperature of the burner, means operatively connecting said thermostatic bimetal chamber with said pressure member to press said pressure member against the membrane and seal said inlet when the temperature of the burner is below the vaporization temperature of the fuel, and means operatively connecting said pressure member with said manually operable means to close the cut-off valve when said contact is opened.

8. In an automatic controlling device for a liquid fuel burner, as claimed in claim 7, a cleaning needle in the burner, an arm in fixed relation to said manually operated means and movable therewith, a nozzle on said burner said arm being adapted to project said cleaning needle through the burner nozzle when the manually operated means are in the position in which the contact is opened and the fuel valve is closed.

References Cited in the file of this patent
UNITED STATES PATENTS

| | | |
|---|---|---|
| 1,529,906 | Morris | Mar. 17, 1925 |
| 1,982,561 | Williams | Nov. 27, 1934 |
| 2,110,222 | Hammers et al. | Mar. 8, 1938 |
| 2,159,257 | Danuser et al. | May 23, 1939 |
| 2,605,821 | Lindahl | Aug. 5, 1952 |